(12) United States Patent
Angelle et al.

(10) Patent No.: US 9,400,069 B2
(45) Date of Patent: Jul. 26, 2016

(54) THREADED CONNECTOR FOR LARGER DIAMETER TUBULAR MEMBERS

(71) Applicant: Frank's Casing Crew and Rental Tools, Inc., Lafayette, LA (US)

(72) Inventors: Jeremy Richard Angelle, Lafayette, LA (US); Robert Thibodeaux, Jr., Lafayette, LA (US); Joshua Hebert, Breaux Bridge, LA (US)

(73) Assignee: Frank's International, LLC, Houston, TX (US)

( * ) Notice: Subject to any disclaimer, the term of this patent is extended or adjusted under 35 U.S.C. 154(b) by 152 days.

(21) Appl. No.: 14/145,565

(22) Filed: Dec. 31, 2013

(65) Prior Publication Data

US 2014/0183862 A1  Jul. 3, 2014

Related U.S. Application Data

(60) Provisional application No. 61/748,333, filed on Jan. 2, 2013.

(51) Int. Cl.
*F16L 25/00* (2006.01)
*F16L 15/00* (2006.01)
*F16L 15/06* (2006.01)

(52) U.S. Cl.
CPC ............ *F16L 15/001* (2013.01); *F16L 15/06* (2013.01); *Y10T 29/49428* (2015.01)

(58) Field of Classification Search
USPC .................. 285/333, 334, 355, 390
See application file for complete search history.

(56) References Cited

U.S. PATENT DOCUMENTS

| | | | | |
|---|---|---|---|---|
| 1,927,656 A | * | 9/1933 | Eaton et al. ............... | 285/115 |
| 2,450,453 A | * | 10/1948 | Boehm ................. | 285/115 |
| 4,153,283 A | * | 5/1979 | Hellmund et al. ........ | 285/334 |
| 4,373,754 A | * | 2/1983 | Bollfrass ............ | E21B 17/0426 |
| | | | | 285/334 |
| 4,449,596 A | | 5/1984 | Boyadjieff | |
| 4,610,467 A | * | 9/1986 | Reimert ................. | 285/24 |

(Continued)

FOREIGN PATENT DOCUMENTS

RU   99325 U1   4/2010
RU   99053 U1   11/2010

(Continued)

OTHER PUBLICATIONS

International Search Report issued in PCT/US2014/010066 mailed Jun. 5, 2014 (2 pages).

(Continued)

*Primary Examiner* — Aaron Dunwoody
(74) *Attorney, Agent, or Firm* — Osha Liang LLP

(57) ABSTRACT

A threaded connector for a large diameter tubular member includes a pin member having an external thread formed thereon with a first contact surface located on one side of the external thread and a sealing element located on the other side of the external thread, and a box member having an internal thread formed thereon with a first contact surface located on one side of the internal thread and a second contact surface located on the other side of the internal thread. The first contact surface of the pin member and the second contact surface of the box member correspond with and are configured to engage with each other, and the first contact surface of the box member and the sealing element of the pin member correspond with and are configured to engage with each other.

24 Claims, 8 Drawing Sheets

(56) References Cited

U.S. PATENT DOCUMENTS

| | | | |
|---|---|---|---|
| 4,707,001 A * | 11/1987 | Johnson | F16L 15/004 |
| | | | 285/332.3 |
| 4,717,183 A * | 1/1988 | Nobileau | 285/334 |
| 5,044,676 A * | 9/1991 | Burton et al. | 285/334 |
| 5,505,502 A * | 4/1996 | Smith et al. | 285/334 |
| 5,954,374 A * | 9/1999 | Gallagher et al. | 285/332 |
| 5,964,486 A * | 10/1999 | Sinclair | 285/331 |
| 6,056,324 A * | 5/2000 | Reimert et al. | 285/18 |
| 6,494,499 B1 * | 12/2002 | Galle et al. | 285/334 |
| 8,287,008 B2 * | 10/2012 | Charvet-Quemin et al. | 285/333 |
| 2002/0017788 A1* | 2/2002 | Krug et al. | 285/333 |
| 2002/0033603 A1* | 3/2002 | Pallini et al. | 285/333 |
| 2002/0105187 A1* | 8/2002 | Taylor | 285/333 |
| 2003/0178847 A1* | 9/2003 | Galle et al. | 285/333 |
| 2004/0155465 A1* | 8/2004 | Noel et al. | 285/334 |
| 2006/0071474 A1* | 4/2006 | Hallett et al. | 285/333 |
| 2011/0068574 A1* | 3/2011 | Morgan et al. | 285/333 |
| 2011/0133449 A1* | 6/2011 | Mazzaferro et al. | 285/333 |
| 2011/0227338 A1* | 9/2011 | Pollack et al. | 285/355 |

FOREIGN PATENT DOCUMENTS

| | | |
|---|---|---|
| SU | 724679 A1 | 3/1980 |
| SU | 993829 A1 | 1/1983 |
| SU | 1004605 A1 | 3/1983 |

OTHER PUBLICATIONS

Written Opinion issued in PCT/US2014/010066 mailed Jun. 5, 2014 (4 pages).

R. Gost; "Thread connections for casing, tubing and pipe-lines and thread gauges for them. General technical requirements"; 51906-2002; Moscow, Russian state standard; 2002, table 2 (57 pages).

\* cited by examiner

THREADED CONNECTOR FOR LARGER DIAMETER TUBULAR MEMBERS

BACKGROUND OF DISCLOSURE

1. Field of the Disclosure

Embodiments disclosed herein generally relate to methods and apparatuses to threadedly connect one tubular member to another tubular member. More specifically, embodiments disclosed herein relate to a threaded connector having multiple contact surfaces to engage with each other.

2. Background Art

In oilfield exploration and production operations, various oilfield tubular members are used to perform important tasks, including, but not limited to, drilling the wellbore and casing a drilled wellbore. For example, a long assembly of drill pipes, known in the industry as a drill string, may be used to rotate a drill bit at a distal end to create the wellbore. Furthermore, after a wellbore has been created, a casing string may be disposed downhole into the wellbore and cemented in place to stabilize, reinforce, or isolate (among other functions) portions of the wellbore. As such, strings of drill pipe and casing may be connected together, such as end-to-end by threaded connections, in which a male "pin" member of a first tubular member is configured to threadably engage a corresponding female "box" member of a second tubular member. Alternatively, a casing string may be made-up of a series of male-male ended casing joints coupled together by female-female couplers. The process by which the threaded connections are assembled is called "making-up" a threaded connection, and the process by which the connections are disassembled is referred to "breaking-out" the threaded connection. As would be understood by one having ordinary skill, individual pieces (or "joints") of oilfield tubular members may come in a variety of weights, diameters, configurations, and lengths.

Referring to FIG. 1, a perspective view is shown of one embodiment of a drilling rig 101 used to run one or more tubular members 111 (e.g., casing, drill pipe, etc.) downhole into a wellbore. As shown, the drilling rig 101 includes a frame structure known as a "derrick" 102, from which a traveling block 103 (which may include a top drive) suspends a lifting apparatus 105 (e.g., an elevator or a tubular (e.g., casing) running tool connected to the quill of a top drive) and a gripping apparatus 107 (e.g., slip assembly or "spider") at the rig floor 109 may be used to manipulate (e.g., raise, lower, rotate, hold, etc.) a tubular member 111. The traveling block 103 is a device that is suspended from at or near the top of the derrick 102, in which the traveling block 103 may move up-and-down (i.e., vertically as depicted) to raise and/or lower the tubular member 111. The traveling block 103 may be a simple "pulley-style" block and may have a hook from which objects below (e.g., lifting apparatus 105 and/or top drive) may be suspended. Drilling rig 101 can be a land or offshore rig (e.g., drill ship) without departing from the scope of the present disclosure.

Additionally, the lifting apparatus 105 may be coupled below the traveling block 103 (and/or a top drive if present) to selectively grab or release a tubular member 111 as the tubular member 111 is to be raised and/or lowered within and from the derrick 102. As such, the top drive may include one or more guiding rails and/or a track disposed adjacent to the top drive, in which the guiding rails or track may be used to support and guide the top drive as the top drive is raised and/or lowered within the derrick. An example of a top drive is disclosed within U.S. Pat. No. 4,449,596, filed on Aug. 3, 1982, and entitled "Drilling of Wells with Top Drive Unit," which is incorporated herein by reference.

Typically, a lifting apparatus 105 includes movable gripping members (e.g., slip assemblies) attached thereto and movable between a retracted (e.g., disengaged) position and an engaged position. In the engaged position, the lifting apparatus 105 supports the tubular member 111 such that the tubular member 111 may be lifted and/or lowered, and rotated if so equipped, e.g., by using a lifting apparatus that is a tubular (e.g., casing) running tool connected to the quill of the top drive. In the retracted position, the lifting apparatus 105 may release the tubular member 111 and move away therefrom to allow the tubular member 111 to be engaged with or removed from the lifting apparatus 105 and/or the gripping apparatus 107. For example, the lifting apparatus 105 may release the tubular member 111 after the tubular member 111 is threadably connected to a tubular string 115 supported by the gripping apparatus 107 (e.g., slip assembly or "spider") at the rig floor 109 at the floor of the drilling rig 101.

Further, in an embodiment in which the drilling rig 101 includes a top drive and a tubular running tool, the tubular member 111 may be supported and gripped by the tubular running tool connected to the quill of the top drive. For example, the tubular running tool may include one or more gripping members that may move radially inward and/or radially outward. In such embodiments, these gripping members of a tubular running tool may move radially outward to grip an internal surface of the tubular member 111, such as with an internal gripping device and/or the gripping members of the tubular running tool may move radially inward to grip an external surface of the tubular member 111, such as with an external gripping device, however so equipped.

Further, the gripping apparatus 107 of the drilling rig 101 may be used to support and suspend the tubular string 115, e.g., by gripping, from the drilling rig 101, e.g., supported by the rig floor 109 or by a rotary table thereof. The gripping apparatus 107 may be disposed within the rig floor 109, such as flush with the rig floor 109, or may extend above the rig floor 109, as shown. As such, the gripping apparatus 107 may be used to suspend the tubular string 115, e.g., while one or more tubular members 111 are connected or disconnected from the tubular string 115.

Accordingly, tubular members that consist of casing may be placed in a wellbore to stabilize a formation and protect a formation against high wellbore pressures (e.g., wellbore pressures that exceed a formation pressure) that could damage the formation. Casing joints are generally larger tubular members of steel that may be coupled in an end-to-end manner by threaded connections, welded connections, and other connections known in the art. The connections are usually designed such that a seal is formed between an interior of the coupled casing joints and an annular space formed between exterior walls of the casing joints and walls of the wellbore. Further, the seal may be an elastomer seal (e.g., an o-ring seal) formed within a threaded connection to prevent liquid and/or gas from escaping out of the interior of the coupled casing joints. Accordingly, it may be desirable for a threaded connection to be able to effectively seal without relying, at least solely, on an elastomer seal, considering the high pressures and temperatures that are often encountered within the downhole environment.

SUMMARY OF CLAIMED SUBJECT MATTER

In one aspect, embodiments disclosed herein relate to a threaded connector for a large diameter tubular member. The threaded connector includes a pin member having an external thread formed thereon with a sealing element located on one side of the external thread and a contact surface located on the other side of the external thread, and a box member having an internal thread formed thereon with a first contact surface located on one side of the internal thread and a second contact surface located on the other side of the internal thread. The external thread of the pin member and the internal thread of the box member correspond with and are configured to engage with each other, the sealing element of the pin member and the second contact surface of the box member correspond with and are configured to engage with each other, and the first contact surface of the box member and the contact surface of the pin member correspond with and are configured to engage with each other.

In another aspect, embodiments disclosed herein relate to a method of manufacturing a threaded connector for a large diameter tubular member. The method includes forming an external thread on a pin member, the pin member having a contact surface located on one side of the external thread and a sealing element located on the other side of the external thread, and forming an internal thread on a box member, the box member having a first contact surface located on one side of the internal thread and a second contact surface located on the other side of the internal thread. The external thread of the pin member and the internal thread of the box member correspond with and are configured to engage with each other, the sealing element of the pin member and the second contact surface of the box member correspond with and are configured to engage with each other, and the first contact surface of the box member and the contact surface of the pin member correspond with and are configured to engage with each other.

In yet another aspect, embodiments disclosed herein relate to a threaded connector for connecting large diameter tubular members together. The threaded connector includes a first tubular member including a pin member having a nose, a load shoulder, and an external thread formed thereon with a contact surface located on one side of the external thread and a sealing element located on the other side of the external thread, and a second tubular member including a box member having a nose, a load shoulder, and an internal thread formed thereon with a first contact surface located on one side of the internal thread and a second contact surface located on the other side of the internal thread. The first tubular member and second tubular member have an outer diameter of at least 20 in (50.8 cm), in which, upon make-up of the pin member with the box member, the load shoulder of the pin member and the nose of the box member are configured to engage with each other, the load shoulder of the box member and the nose of the pin member are configured to engage with each other, the external thread of the pin member and the internal thread of the box member are configured to engage with each other, the sealing element of the pin member and the second contact surface of the box member are configured to engage with each other, thereby forming a seal therebetween, and the first contact surface of the box member and the contact surface of the pin member are configured to engage with each other, thereby forming a metal-to-metal seal therebetween.

Other aspects and advantages of the invention will be apparent from the following description and the appended claims.

DETAILED DESCRIPTION

Figure 1:
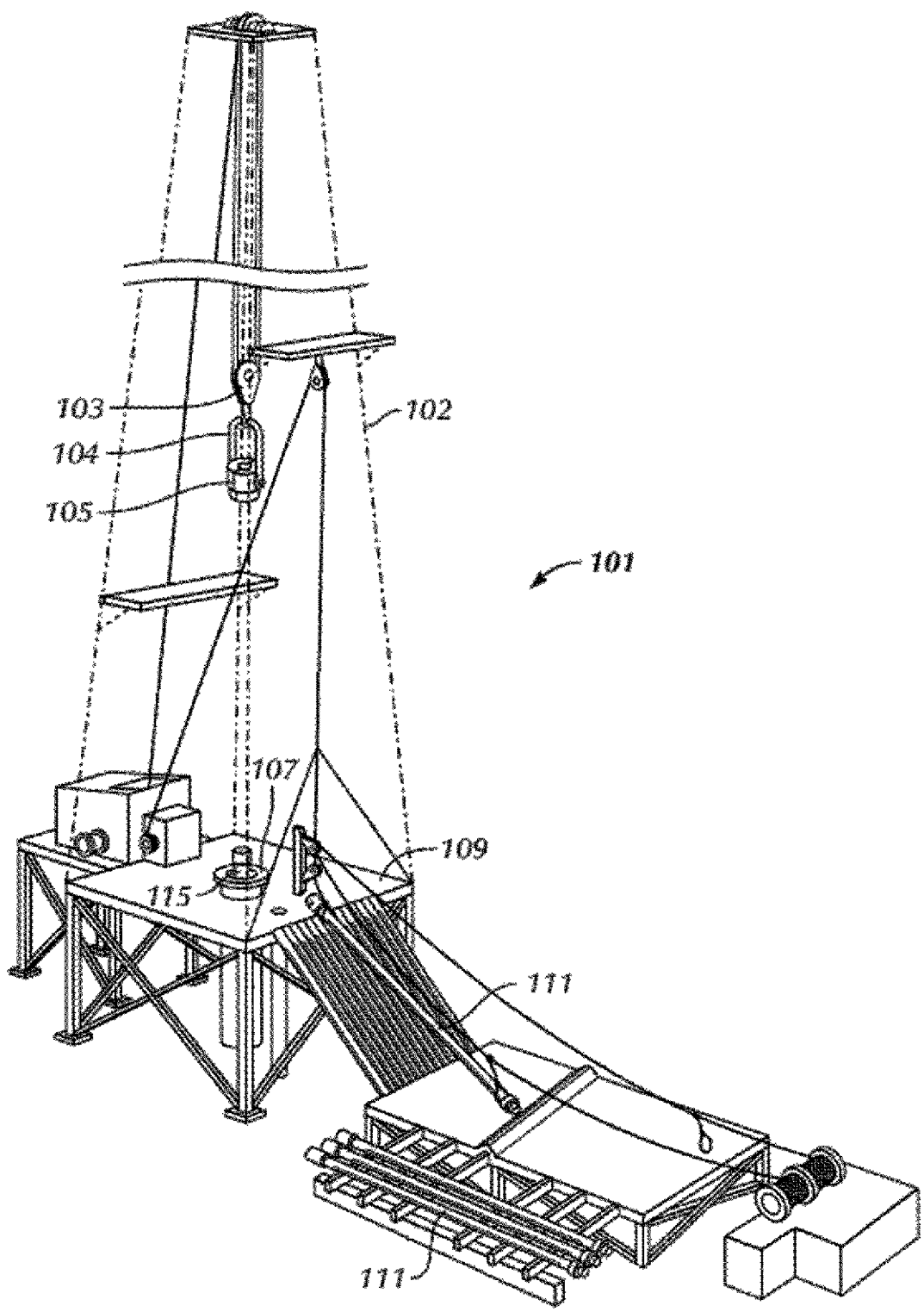
FIG. 1 is a schematic view of a drilling rig.

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

Furthermore, those having ordinary skill in the art will appreciate that when describing connecting a first element to a second element, it is understood that connecting may be either directly connecting the first element to the second element, or indirectly connecting the first element to the second element. For example, a first element may be directly connected to a second element, such as by having the first element and the second element in direct contact with each other, or a first element may be indirectly connected to a second element, such as by having a third element, and/or additional elements, connected between the first and second elements.

In one aspect, embodiments disclosed herein generally relate to a threaded connector to couple a first tubular member to a second tubular member. The threaded connector includes a pin member having an external thread formed thereon and a box member having an internal thread formed thereon, in which the pin member and the box member may be made-up with each other such that the external thread on the pin member corresponds and engages with the internal thread on the box member.

The threaded connector further includes the pin member having a first contact surface located on one side of the external thread and a second contact surface located on the other side of the external thread, and the box member has a first contact surface located on one side of the internal thread and a second contact surface located on the other side of the internal thread. The pin member may include a load shoulder formed thereon configured to engage a nose of the box member, in which the first contact surface of the pin member may be disposed on the load shoulder of the pin member and the second contact surface of the box member may be disposed upon the nose of the box member.

At least a portion of the first contact surface of the pin member and the second contact surface of the box member may extend in a direction substantially similar to that as the first contact surface of the box member and the second contact surface of the pin member, and/or may extend in a direction substantially similar to that as an axis of the threaded connector. For example, at least a portion of the first contact surface of the pin member and the second contact surface of the box member may be disposed within about ten degrees of the first contact surface of the box member and the second contact surface of the pin member, and/or within about ten degrees of the axis of the threaded connector. The first contact surface of the pin member may also be located near a proximal end of the pin member and the second contact surface of the pin member may be located near a distal end of the pin member, in which the first contact surface of the box member may be located near a proximal end of the box member and the second contact surface of the box member may be located near a distal end of the box member.

When the pin member and the box member of the threaded connector are made-up with each other, the first contact surface of the pin member corresponds with and engages with the second contact surface of the box member and the first contact surface of the box member corresponds with and engages with the second contact surface of the pin member. As such, the first contact surface of the pin member may engage with the second contact surface of the box member to form a first metal-to-metal seal therebetween within the threaded connector, and the first contact surface of the box member may engage with the second contact surface of the pin member to form a second metal-to-metal seal therebetween within the threaded connector. Accordingly, the threaded connector may be used to effectively seal against and prevent any fluid and/or gas from escaping or entering the tubular members connected using the threaded connector.

In accordance with one or more embodiments of the present disclosure, the external thread of the pin member and the internal thread of the box member may be formed on a substantially single taper, in which the first contact surface of the pin member and/or the first contact surface of the box member may protrude above a plane extending across the substantially single taper. Further, the first contact surface of the pin member may protrude above a plane extending across a top of the external thread of the pin member, and/or the first contact surface of the box member may protrude above a plane extending across a top of the internal thread of the box member.

In accordance with one or more embodiments of the present disclosure, the pin member and/or the box member of the threaded connector may include a load redirection groove formed thereon and/or may include an alignment surface formed thereon. Further, the pin member may include a load shoulder that is configured to engage a nose of the box member, and similarly the box member may include a load shoulder that is configured to engage a nose of the pin member. Furthermore, the external thread of the pin member may include a pin load flank and the internal thread of the box member may include a box load flank, with each of the pin load flank and the box load flank having a negative flank angle.

Figure 2:
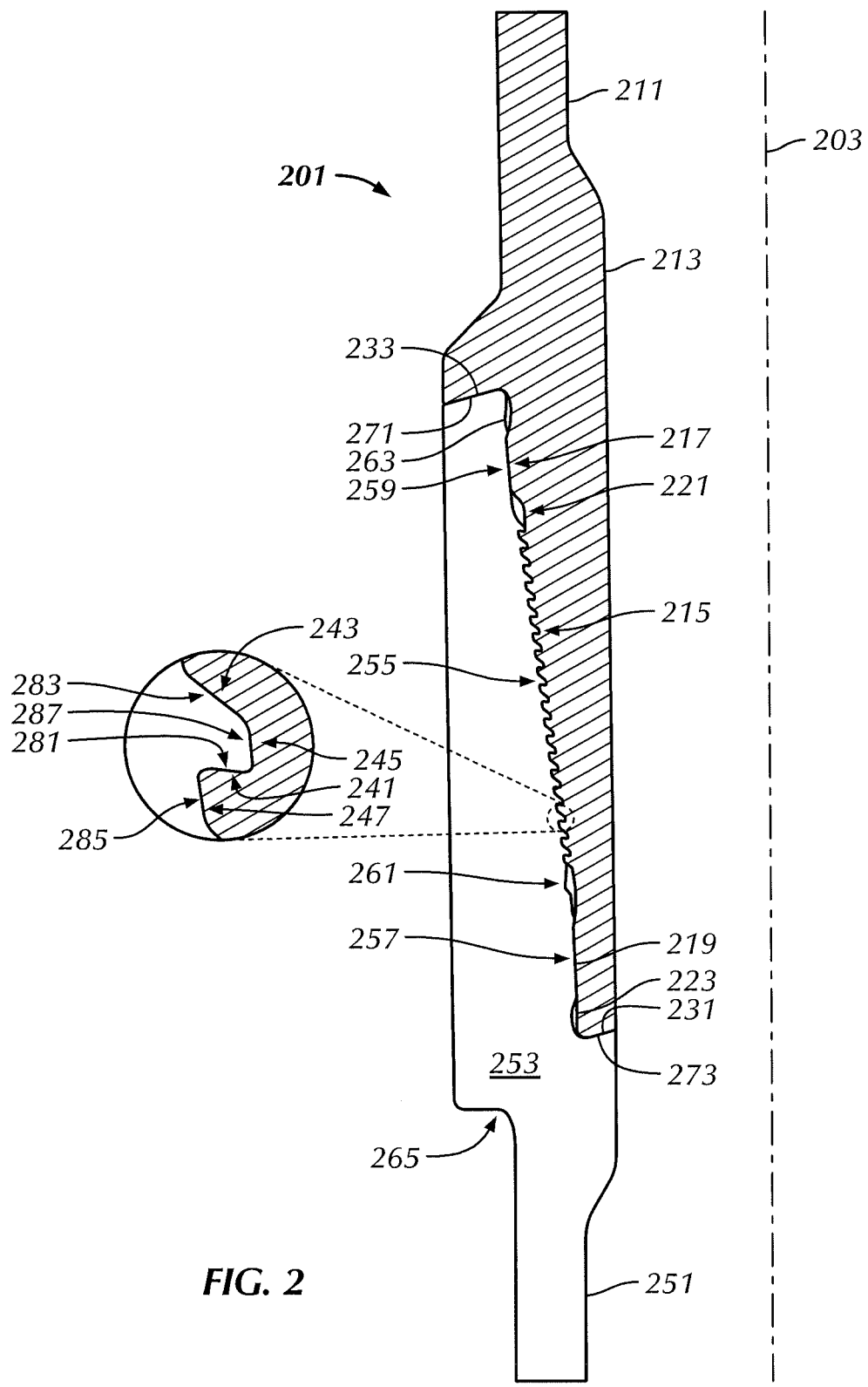
FIG. 2 shows a cross-sectional view of a threaded connector in accordance with one or more embodiments disclosed herein.

Referring now to FIG. 2, a cross-sectional view of a threaded connector 201 in accordance with one or more embodiments disclosed herein is shown. The threaded connector 201 may be used to threadedly connect and engage a first tubular member 211 having a pin member 213 with a second tubular member 251 having a box member 253. For example, the first tubular member 211 may have the pin member 213 formed thereon or included therewith, and the second tubular member 251 may have the box member 253 formed thereon or included therewith. The pin member 213 may be inserted within the box member 253 and rotated with respect to the box member 253 to have the pin member 213 and the box member 253 make-up and form the threaded connector 201. As such, the threaded connector 201, as shown in FIG. 2, may have an axis 203 extending therethrough, in which the axis 203 may be substantially aligned with the axis of the first tubular member 211 and/or the second tubular member 251.

As shown, the pin member 213 may have an external thread 215 and the box member 253 may have an internal thread 255, in which the threads 215 and 255 may be formed on or included with the pin member 213 and the box member 253, respectively. Further, the pin member 213 may include a first contact surface 217 and a second contact surface 219, and the box member 253 may include a first contact surface 257 and a second contact surface 259. The first contact surface 217 may be located near a proximal end of the pin member 213 and the second contact surface 219 may be located near a distal end of the pin member 213. Further, the first contact surface 257 may be located near a proximal end of the box member 253 and the second contact surface 259 may be located near a distal end of the box member 253.

Accordingly, as discussed above, the pin member 213 and the box member 253 may be made-up with each other, in which the external thread 215 on the pin member 213 may correspond and engage with the internal thread 255 on the box member 253. When the pin member 213 and the box member 253 of the threaded connector 201 are made-up with each other, the first contact surface 217 of the pin member 213 may correspond and engage with the second contact surface 259 of the box member 253, and the first contact surface 257 of the box member 253 may correspond and engage with the second contact surface 219 of the pin member 213.

In accordance with one or more embodiments of the present disclosure, the engagement of the first contact surface 217 of the pin member 213 with the second contact surface 259 of the box member 253 may form a first metal-to-metal seal between the pin member 213 and the box member 253 of the threaded connector 201. Further, the engagement of the first contact surface 257 of the box member 253 with the second contact surface 219 of the pin member 213 may form a second metal-to-metal seal between the pin member 213 and the box member 253 of the threaded connector 201. As such, this engagement and configuration may enable the threaded connector 201 to have at least two metal-to-metal seals formed therein, with one formed on each side of the threads 215 and 255 of the threaded connector 201. This may enable the first metal-to-metal seal to be formed adjacent the proximal end of the pin member 213 and the distal end of the box member 253, with the second metal-to-metal seal formed adjacent the proximal end of the box member 253 and the distal end of the pin member 213. The metal-to-metal seals may be formed from having the contact surfaces of the pin member and the box member contacting each other, such as by having the contact surfaces yield with elastic and/or plastic deformation when contacting each other. Accordingly, a threaded connector in accordance with one or more embodiments disclosed herein may be used to seal against and prevent any fluid and/or gas from escaping or entering the tubular members connected using the threaded connector.

Referring still to FIG. 2, the external thread 215 of the pin member 213 and the internal thread 255 of the box member 253 may be formed on a substantially single taper, as shown. Alternatively, a threaded connector in accordance with the present disclosure may be a multi-step threaded connector, in which the external thread of the pin member and the internal thread of the box member may be formed on more than one taper, thereby forming a step within the threaded connector between each of the tapers.

One or more of the contact surfaces within the threaded connector may be formed to protrude and extend towards other contact surfaces included within the threaded connector. For example, in an embodiment in which the threaded connector 201 includes a taper, such as shown in FIG. 2, the first contact surface 217 of the pin member 213 and/or the first contact surface 257 of the box member 253 may protrude above a plane extending across the taper. The first contact surface 217 of the pin member 213 may protrude in a direction towards the second contact surface 259 of the box member 253, and the first contact surface 257 of the box member 253 may protrude in a direction towards the second contact surface 219 of the pin member 213. As such, in one or more embodiments, the first contact surface 217 of the pin member 213 may protrude above a plane extending across a top of the external thread 215 of the pin member 213, and the first contact surface 257 of the box member 253 may protrude above a plane extending across a top of the internal thread 255 of the box member 253. One or more of the above configurations may enable a threaded connector in accordance with the present disclosure to form two or more metal-to-metal seals therein.

In accordance with one or more embodiments, a threaded connector of the present disclosure may include one or more load shoulders to have a nose of the pin or box member engage the shoulder of the other of the pin or box member. For example, as shown in FIG. 2, the pin member 213 may include a nose 231 disposed at the distal end of the pin member 213 and a load shoulder 233 disposed at the proximal end of the pin member 213, and the box member 253 may include a nose 271 disposed at the distal end of the box member 253 and a load shoulder 273 disposed at the proximal end of the box member 253. As such, when the threaded connector 201 is made-up, the nose 231 of the pin member 213 may engage the load shoulder 273 of the box member 253, and the nose 271 of the box member 253 may engage the load shoulder 233 of the pin member 213.

Further, the nose 231 of the pin member 213 and the load shoulder 273 of the box member 253 may be tapered, and the nose 271 of the box member 253 and the load shoulder 233 of the pin member 213 may be tapered, such as by having these elements tapered with respect to the axis 203. As shown, the taper for the nose 231 of the pin member 213 and the load shoulder 273 of the box member 253 may be a negative taper, such that engagement of the nose 231 of the pin member 213 with the load shoulder 273 of the box member 253 may increase the engagement, contact pressure, and force between the first contact surface 257 of the box member 253 with the second contact surface 219 of the pin member 213. Further, the taper for the nose 271 of the box member 253 and the load shoulder 233 of the pin member 213 may be a negative taper, such that the engagement of the nose 271 of the box member 253 with the load shoulder 233 of the pin member 213 may increase the engagement, contact pressure, and force between the first contact surface 217 of the pin member 213 with the second contact surface 259 of the box member 253. Accordingly, a nose and a load shoulder for a pin member and/or a box member in accordance with the present disclosure may have a taper between about one degree to about ten degrees, including one degree, two degree, three degrees, four degrees, five degrees, six degrees, seven degrees, eight degrees, nine degrees, and ten degrees.

In accordance with one or more embodiments of the present disclosure, the threaded connector may include one or more features to reduce stress or stress concentrations within the threaded connector. For example, as shown in FIG. 2, the threaded connector 201 may include one or more load redirection grooves, such as by having a load redirection groove 221 formed and/or included on the pin member 213, and/or a load redirection groove 261 formed and/or included on the box member 253. The load redirection groove 221 may be located between the external thread 215 and the first contact surface 217 of the pin member 213, and the load redirection groove 261 may be located between the internal thread 255 and the first contact surface 257 of the box member 253. Accordingly, the one or more load redirections grooves may be used to reduce stress concentrations within the threaded connector, such as by reducing stress located and concentrated near the end of the threads and/or the nose and load shoulders of the threaded connector.

Referring still to FIG. 2, the pin member 213 includes the external thread 215 and the box member 253 includes the internal thread 255. The external thread 215 of the pin member 213 may include a pin load flank 241 and a pin stab flank 243, which correspond with a box load flank 281 and a box stab flank 283 of the internal thread 255 of the box member 253, respectively. Further, the external thread 215 of the pin member 213 may include a pin root 245 and a pin crest 247, which correspond with a box crest 287 and a box root 285 of the internal thread 255 of the box member 253, respectively. As such, and as shown in FIG. 2, the pin load flank 241 and the box load flank 281 may have a negative flank angle. This configuration and thread form may enable the threads of the threaded connector to engage each other and prevent the threads from "jumping out," or otherwise disengaging each other, particularly as the tension across the threaded connector increases.

In accordance with one or more embodiments of the present disclosure, the threaded connector may include one or more features to assist with alignment and position within the threaded connector, such as when preparing and aligning the pin member and the box member for make-up. For example, as shown in FIG. 2, the threaded connector 201 may include one or more alignment surfaces located on the pin member and/or the box member, such as by having an alignment surface 223 formed and/or included on the pin member 213, and/or an alignment surface 263 formed and/or included on the box member 253. The alignment surface 223 may be located on the distal end of the pin member 213, and the alignment surface 263 may be located on the distal end of the box member 253. Accordingly, the alignment surfaces may be used to bring the pin member into alignment with the box member before the threads of the threaded connector engage, thereby preventing any cross-threading of the threads within the threaded connector.

Furthermore, a threaded connector in accordance with the present disclosure may include one or more shoulders to enable the threaded connector, and the tubular members connected through the threaded connector, to be supported from. For example, with reference to FIG. 2, the box member 253 may include a shoulder 265 to support the threaded connector 201 therefrom. The shoulder 265 may be used to have an elevator support the second tubular member 251, such as the lifting apparatus 105 shown in FIG. 1. As such, an elevator or similar lifting apparatus may engage the second tubular member 251 at the shoulder 265, thereby having the box member 253 lifted by the elevator through the shoulder 265. As shown, the shoulder 265 may be formed to have an elliptical groove formed external to the box member 253 to reduce any concentration of stress at the shoulder 265.

Figure 3:
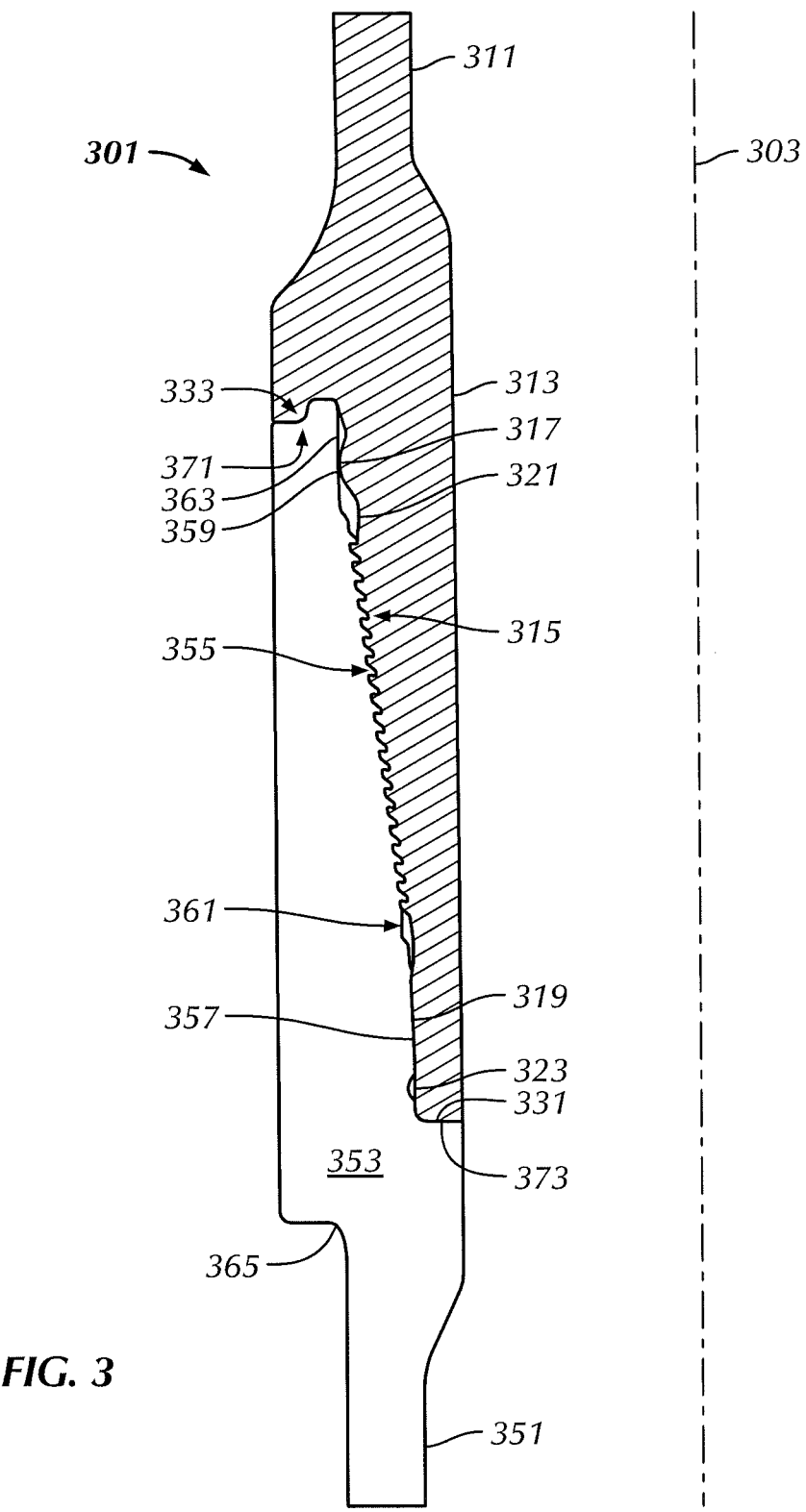
FIG. 3 shows a cross-sectional view of a threaded connector in accordance with one or more embodiments disclosed herein.

Referring now to FIG. 3, a cross-sectional view of a threaded connector 301 in accordance with one or more embodiments disclosed herein is shown. Similar to the threaded connector 201 shown in FIG. 2, the threaded connector 301 may be used to threadedly connect and engage a first tubular member 311 having a pin member 313 with a second tubular member 351 having a box member 353. For example, the first tubular member 311 may have the pin member 313 formed thereon or included therewith, and the second tubular member 351 may have the box member 353 formed thereon or included therewith. The pin member 313 may be inserted within the box member 353 and rotated with respect to the box member 353 to have the pin member 313 and the box member 353 make-up and form the threaded connector 301. As such, the threaded connector 301, as shown in FIG. 3, may have an axis 303 extending therethrough, in which the axis 303 may be substantially aligned with the axis of the first tubular member 311 and/or the second tubular member 351.

The pin member 313 may have an external thread 315 and the box member 353 may have an internal thread 355. As with the threaded connector 201 shown in FIG. 2, the pin member 313 may include a first contact surface 317 and a second contact surface 319, and the box member 353 may include a first contact surface 357 and a second contact surface 359. In FIG. 3, the first contact surface 317 of the pin member 313 may be located on one side of the external thread 315 and the second contact surface 319 may be located on the other side of the external thread 315. The first contact surface 357 of the box member 353 may be located on one side of the internal thread 355 and the second contact surface 359 may be located on the other side of the internal thread 355.

As discussed above, in accordance with one or more embodiments, a threaded connector of the present disclosure may include one or more load shoulders to have a nose of the pin or box member engage the shoulder of the other of the pin or box member. For example, as shown in FIG. 3, the pin member 313 may include a nose 331 disposed at the distal end of the pin member 313 and a load shoulder 333 disposed at the proximal end of the pin member 313, and the box member 353 may include a nose 371 disposed at the distal end of the box member 353 and a load shoulder 373 disposed at the proximal end of the box member 353. As such, when the threaded connector 301 is made-up, the nose 331 of the pin member 313 may engage the load shoulder 373 of the box member 353, and the nose 371 of the box member 353 may engage the load shoulder 333 of the pin member 313. As such, in one or more embodiments, the first contact surface 317 of the pin member 313 may be disposed on the load shoulder 333 of the pin member 313 and the second contact surface 359 of the box member 353 may be disposed upon the nose 371 of the box member 353.

In one or more embodiments, at least a portion of the first contact surface 317 of the pin member 313 and of the second contact surface 359 of the box member 353 may extend in a direction substantially similar to that as the first contact surface 357 of the box member 353 and the second contact surface 319 of the pin member 313, and/or may extend in a direction substantially similar to that as the axis 303 of the threaded connector 301. For example, at least a portion of the first contact surface 317 of the pin member 313 and of the second contact surface 359 of the box member 353 may be disposed within about ten degrees of the first contact surface 357 of the box member 353 and the second contact surface 319 of the pin member 313, and/or within about ten degrees of the axis 303 of the threaded connector 301, including one degree, two degree, three degrees, four degrees, five degrees, six degrees, seven degrees, eight degrees, nine degrees, and ten degrees.

As discussed above, the pin member 313 and the box member 353 may be made-up with each other, in which the external thread 315 on the pin member 313 may correspond and engage with the internal thread 355 on the box member 353. When the pin member 313 and the box member 353 of the threaded connector 301 are made-up with each other, the first contact surface 317 of the pin member 313 may correspond and engage with the second contact surface 359 of the box member 353, and the first contact surface 357 of the box member 353 may correspond and engage with the second contact surface 319 of the pin member 313.

Further, the engagement of the first contact surface 317 of the pin member 313 with the second contact surface 359 of the box member 353 may form a first metal-to-metal seal between the pin member 313 and the box member 353 of the threaded connector 301. Further, the engagement of the first contact surface 357 of the box member 353 with the second contact surface 319 of the pin member 313 may form a second metal-to-metal seal between the pin member 313 and the box member 353 of the threaded connector 301. As such, this engagement and configuration may enable the threaded connector 301 to have at least two metal-to-metal seals formed therein, with one formed on each side of the threads 315 and 355 of the threaded connector 301. This may enable the first metal-to-metal seal to be formed adjacent the proximal end of the pin member 313 and the distal end of the box member 353, with the second metal-to-metal seal formed adjacent the proximal end of the box member 353 and the distal end of the pin member 313. The metal-to-metal seals may be formed from having the contact surfaces of the pin member and the box member contacting each other, such as by having the contact surfaces yield with elastic and/or plastic deformation when contacting each other. Accordingly, a threaded connector in accordance with one or more embodiments disclosed herein may be used to seal against and prevent any fluid and/or gas from escaping or entering the tubular members connected using the threaded connector.

The threaded connector 301 may include one or more load redirection grooves, such as by having a load redirection groove 321 formed and/or included on the pin member 313, and/or a load redirection groove 361 formed and/or included on the box member 353. The load redirection groove 321 may be located adjacent the external thread 315 of the pin member 313, and the load redirection groove 361 may be located adjacent the internal thread 355 of the box member 353.

Referring still to FIG. 3, the threaded connector 301 may include one or more alignment surfaces located on the pin member and/or the box member, such as by having an alignment surface 323 formed and/or included on the pin member 313, and/or an alignment surface 363 formed and/or included on the box member 353. The alignment surface 323 may be located on the distal end of the pin member 313, and the alignment surface 363 may be located on the distal end of the box member 353.

Further, a threaded connector in accordance with one or more embodiments of the present disclosure may include one or more surfaces that are formed to engage with the alignment surfaces of the threaded connector. For example, as shown in FIG. 3, the threaded connector 301 may include an engagement surface formed on the pin member 313 that engages with the alignment surface 363 of the box member 353 to facilitate alignment and engagement between the pin member 313 and the box member 353. In one or more embodiments, an engagement surface may include a spherical surface formed and/or included on a taper on the pin member 313 and/or the box member 353.

Furthermore, in one or more embodiments, the box member 353 may include a shoulder 365 to support the threaded connector 301 therefrom. The shoulder 365 may be used to have an elevator support the second tubular member 351, such as the lifting apparatus 105 shown in FIG. 1. As such, an elevator or similar lifting apparatus may engage the second tubular member 351 at the shoulder 365, thereby having the box member 353 lifted by the elevator through the shoulder 365.

Figure 4:
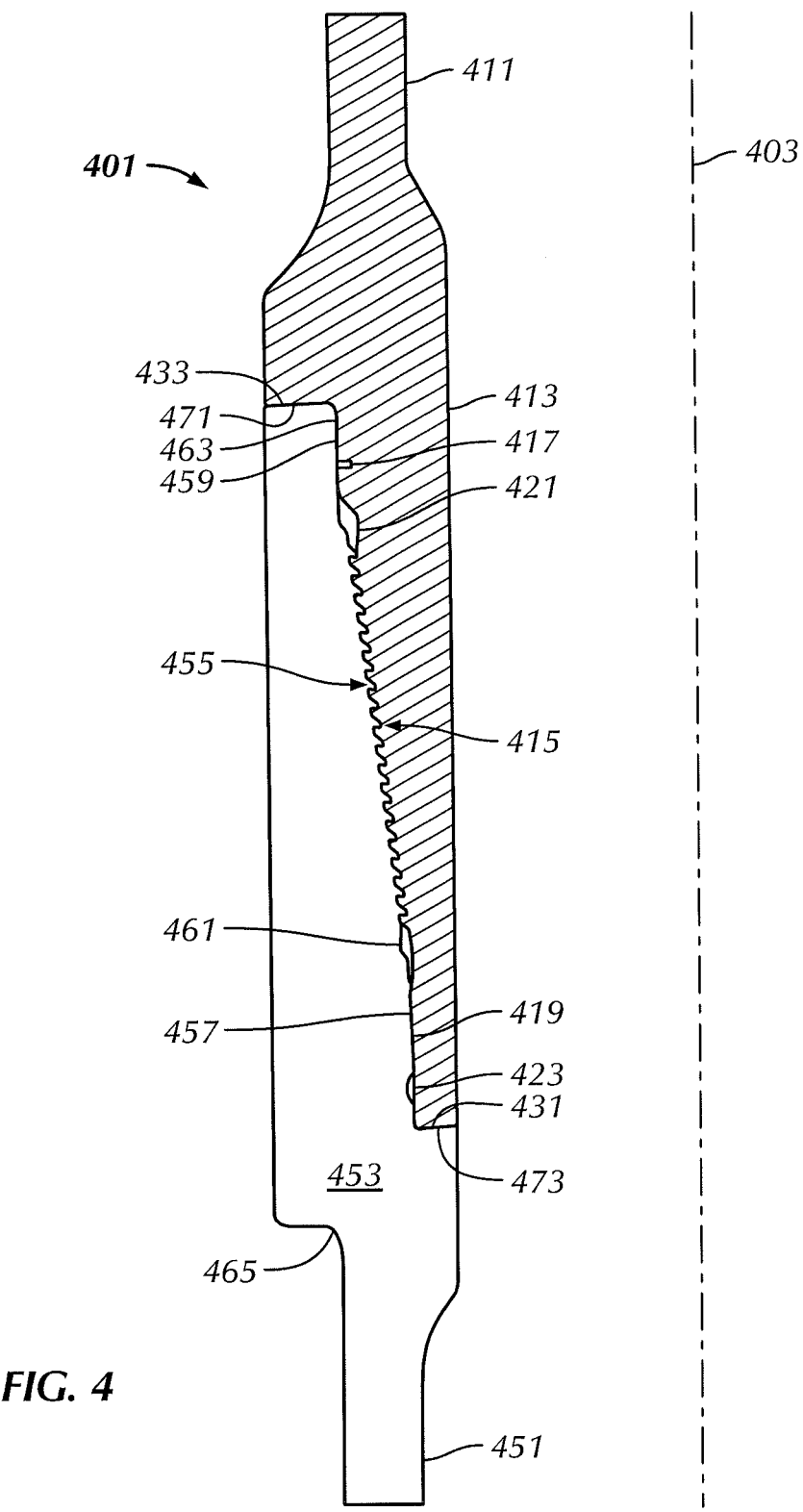
FIG. 4 shows a cross-sectional view of a threaded connector in accordance with one or more embodiments disclosed herein.

Referring now to FIG. 4, a cross-sectional view of a threaded connector 401 in accordance with one or more embodiments disclosed herein is shown. Similar to the threaded connectors shown in FIGS. 2 and 3, the threaded connector 401 may be used to threadedly connect and engage a first tubular member 411 having a pin member 413 with a second tubular member 451 having a box member 453. For example, the first tubular member 411 may have the pin member 413 formed thereon or included therewith, and the second tubular member 451 may have the box member 453 formed thereon or included therewith. The pin member 413 may be inserted within the box member 453 and rotated with respect to the box member 453 to have the pin member 413 and the box member 453 make-up and form the threaded connector 401. As such, the threaded connector 401, as shown in FIG. 4, may have an axis 403 extending therethrough, in which the axis 403 may be substantially aligned with the axis of the first tubular member 411 and/or the second tubular member 451.

The pin member 413 may have an external thread 415 and the box member 453 may have an internal thread 455. Further, in FIG. 4, the pin member 413 may include a sealing element 417 and a contact surface 419, and the box member 453 may include a first contact surface 457 and a second contact surface 459. In FIG. 4, the sealing element 417 of the pin member 413 may be located on one side of the external thread 415 and the contact surface 419 may be located on the other side of the external thread 415. The first contact surface 457 of the box member 453 may be located on one side of the internal thread 455 and the second contact surface 459 may be located on the other side of the internal thread 455.

As discussed above, in accordance with one or more embodiments, a threaded connector of the present disclosure may include one or more load shoulders to have a nose of the pin or box member engage the shoulder of the other of the pin or box member. For example, as shown in FIG. 4, the pin member 413 may include a nose 431 disposed at the distal end of the pin member 413 and a load shoulder 433 disposed at the proximal end of the pin member 413, and the box member 453 may include a nose 471 disposed at the distal end of the box member 453 and a load shoulder 473 disposed at the proximal end of the box member 453. As such, when the threaded connector 401 is made-up, the nose 431 of the pin member 413 may engage the load shoulder 473 of the box member 453, and the nose 471 of the box member 453 may engage the load shoulder 433 of the pin member 413.

In one or more embodiments, at least a portion of the sealing element 417 of the pin member 413 and of the second contact surface 459 of the box member 453 may extend in a direction substantially similar to that as the first contact surface 457 of the box member 453 and the contact surface 419 of the pin member 413, and/or may extend in a direction substantially similar to that as the axis 403 of the threaded connector 401. For example, at least a portion of the second contact surface 459 of the box member 453 may be disposed within about ten degrees of the first contact surface 457 of the box member 453 and the contact surface 419 of the pin member 413, and/or within about ten degrees of the axis 403 of the threaded connector 401, including one degree, two degree, three degrees, four degrees, five degrees, six degrees, seven degrees, eight degrees, nine degrees, and ten degrees.

As discussed above, the pin member 413 and the box member 453 may be made-up with each other, in which the external thread 415 on the pin member 413 may correspond and engage with the internal thread 455 on the box member 453. When the pin member 413 and the box member 453 of the threaded connector 401 are made-up with each other, the sealing element 417 of the pin member 413 may correspond and engage with the second contact surface 459 of the box member 453, and the first contact surface 457 of the box member 453 may correspond and engage with the contact surface 419 of the pin member 413.

Further, the engagement of the sealing element 417 of the pin member 413 with the second contact surface 459 of the box member 453 may form a seal between the pin member 413 and the box member 453 of the threaded connector 401. Further, the engagement of the first contact surface 457 of the box member 453 with the contact surface 419 of the pin member 413 may form a metal-to-metal seal between the pin member 413 and the box member 453 of the threaded connector 401. As such, this engagement and configuration may enable the threaded connector 401 to have at least two seals formed therein, with one formed on each side of the threads 415 and 455 of the threaded connector 401. This may enable the first seal to be formed adjacent the proximal end of the pin member 413 and the distal end of the box member 453, with the second seal, a metal-to-metal seal, formed adjacent the proximal end of the box member 453 and the distal end of the pin member 413. Accordingly, a threaded connector in accordance with one or more embodiments disclosed herein may be used to seal against and prevent any fluid and/or gas from escaping or entering the tubular members connected using the threaded connector.

In one or more embodiments, the sealing element 417 of the pin member 413 may include any known sealing element used in the art. As shown in FIG. 4, the sealing element 417 may include an o-ring, in which the o-ring may be disposed within a groove formed upon the pin member 413. As such, the groove may be formed adjacent the proximal end of the pin member 413, in which the o-ring may be disposed within the groove. Those having ordinary skill in the art will appreciate that other sealing elements may be used without departing from the scope of the present disclosure.

The threaded connector 401 may include one or more load redirection grooves, such as by having a load redirection groove 421 formed and/or included on the pin member 413, and/or a load redirection groove 461 formed and/or included on the box member 453. The load redirection groove 421 may be located adjacent the external thread 415 of the pin member 413, and the load redirection groove 461 may be located adjacent the internal thread 455 of the box member 453.

Referring still to FIG. 4, the threaded connector 401 may include one or more alignment surfaces located on the pin member and/or the box member, such as by having an alignment surface 423 formed and/or included on the pin member 413, and/or an alignment surface 463 formed and/or included on the box member 453. The alignment surface 423 may be located on the distal end of the pin member 413, and the alignment surface 463 may be located on the distal end of the box member 453.

Further, a threaded connector in accordance with one or more embodiments of the present disclosure may include one or more surfaces that are formed to engage with the alignment surfaces of the threaded connector. For example, as shown in FIG. 4, the threaded connector 401 may include an engagement surface formed on the pin member 413 that engages with the alignment surface 463 of the box member 453 to facilitate alignment and engagement between the pin member 413 and the box member 453. In one or more embodiments, an engagement surface may include a spherical surface formed and/or included on a taper on the pin member 413 and/or the box member 453.

Furthermore, in one or more embodiments, the box member 453 may include a shoulder 465 to support the threaded connector 401 therefrom. The shoulder 465 may be used to have an elevator support the second tubular member 451, such as the lifting apparatus 105 shown in FIG. 1. As such, an elevator or similar lifting apparatus may engage the second tubular member 451 at the shoulder 465, thereby having the box member 453 lifted by the elevator through the shoulder 465.

Referring now to FIGS. 5A-5D, multiple views of torque-turn charts for one or more threaded connectors in accordance with the present disclosure are shown. Particularly, FIGS. 5A-5D provide torque-turn charts relating make-up torque and make-up/break-out rotation for a threaded connector in accordance with an embodiment shown in FIG. 4.

Figure 5A:
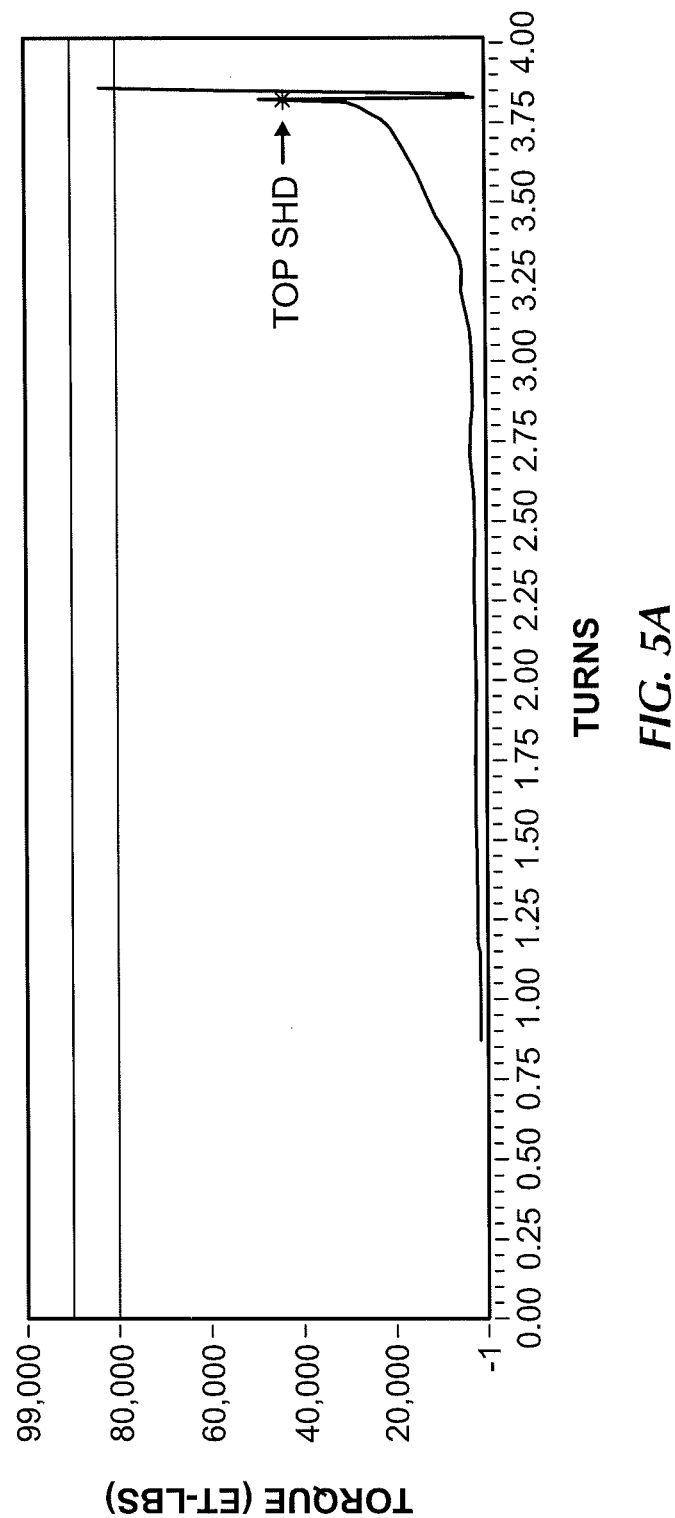
FIGS. 5A-5D show multiple views of torque-turn charts for one or more threaded connectors in accordance with one or more embodiments disclosed herein.
Figure 5B:
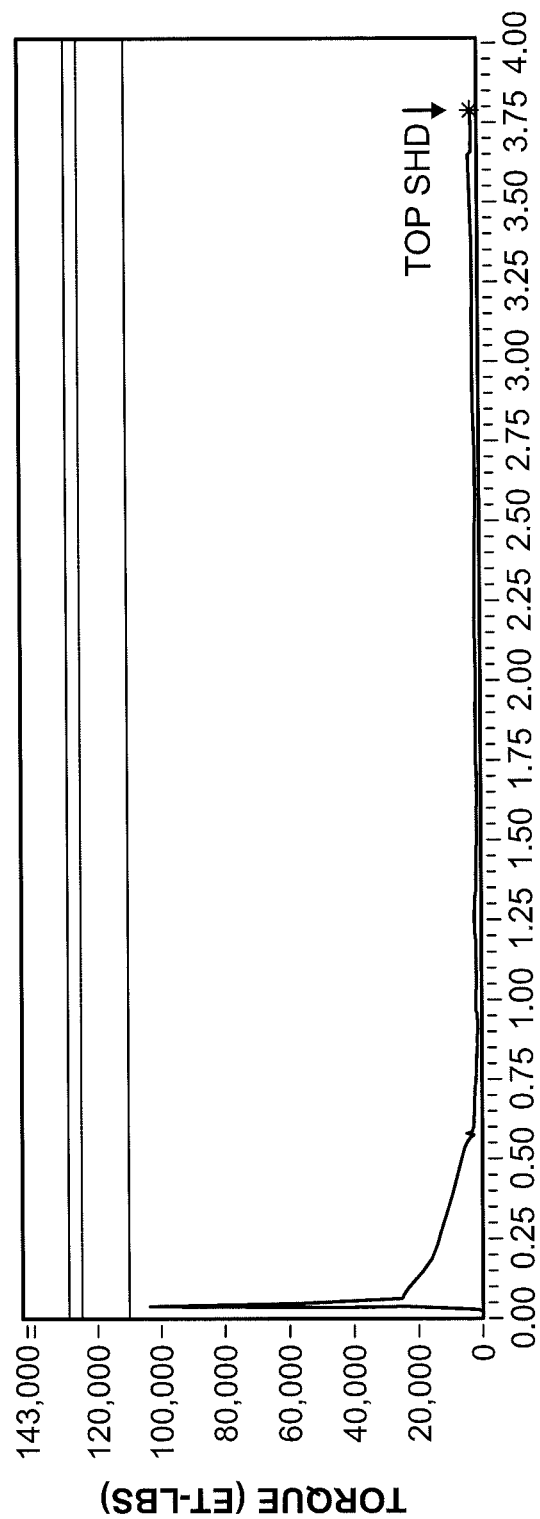

FIG. 5A shows a torque-turn chart when making-up a threaded connector, in which the maximum torque is about 83,700 ft-lbs (113,500 N-m), the shoulder torque is about 30,000 ft-lbs (40,700 N-m), the delta torque is about 53,700 ft-lbs (72,800 N-m), the maximum turns is about 3.860 turns, the shoulder turns is about 3.818 turns, and the delta turns is about 0.041 turns. FIG. 5B shows a torque-turn chart when breaking-out the threaded connector from FIG. 5A, in which the maximum torque is about 104,701 ft-lbs (141,955 N-m), the shoulder torque is about 25,000 ft-lbs (33,900 N-m), the delta torque is about 79,700 ft-lbs (108,100 N-m), the maximum turns is about 3.787 turns, the shoulder turns is about 3.746 turns, and the delta turns is about 0.041 turns.

Figure 5C:
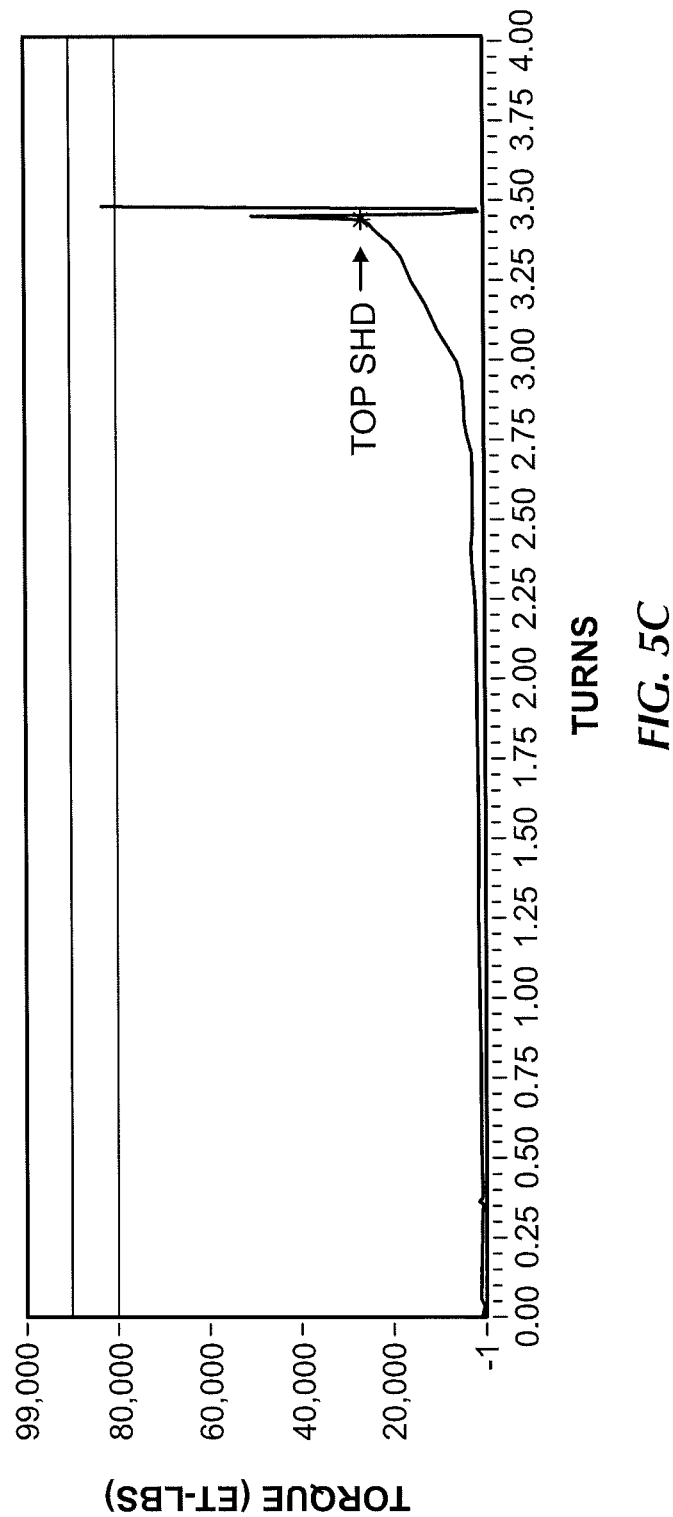
Figure 5D:
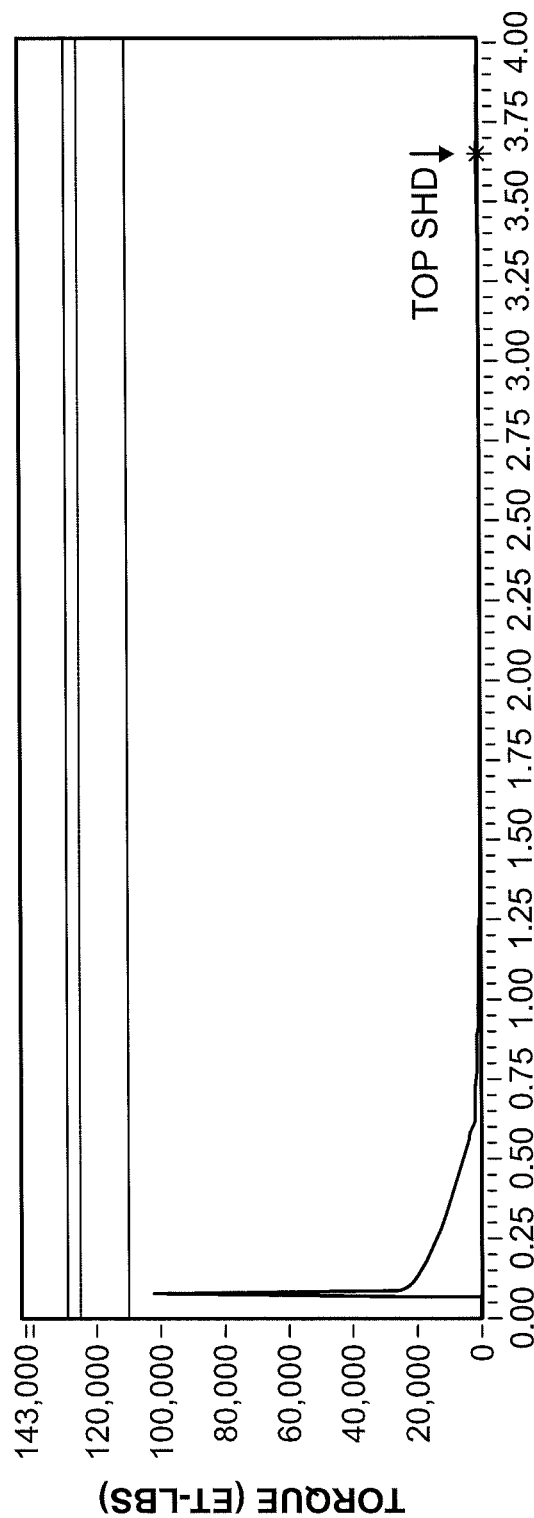

FIG. 5C shows a torque-turn chart when making-up a threaded connector, in which the maximum torque is about 83,479 ft-lbs (113,182 N-m), the shoulder torque is about 26,263 ft-lbs (35,607 N-m), the delta torque is about 57,215 ft-lbs (77,573 N-m), the maximum turns is about 3.860 turns, the shoulder turns is about 3.818 turns, and the delta turns is about 0.041 turns. FIG. 5D shows a torque-turn chart when breaking-out the threaded connector from FIG. 5C, in which the maximum torque is about 102,742 ft-lbs (139,299 N-m), the shoulder torque is about 25,000 ft-lbs (33,900 N-m), the delta torque is about 77,700 ft-lbs (105,300 N-m), the maximum turns is about 3.787 turns, the shoulder turns is about 3.746 turns, and the delta turns is about 0.041 turns.

An apparatus in accordance with one or more embodiments of the present disclosure may be helpful in multiple areas, such as within the oil and gas industry. For example, a threaded connector in accordance with one or more embodiments of the present disclosure may be used to couple tubular members together. As such, a threaded connector of the present disclosure may be used to couple larger tubular members to each other, such as tubular members used for casing, in which an outer diameter of the tubular members is at least 20 in (50.8 cm) or more. Further, as discussed above, a threaded connector in accordance with the present disclosure may be used to seal and prevent fluid and/or gas from escaping and leaking across the threaded connector. Accordingly, in an embodiment in which the threaded connector of the present disclosure is used to couple tubular members of casing together, the threaded connector may prevent fluid and/or gas from leaking into or out of the casing string.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A threaded connector for a large diameter tubular member, the threaded connector comprising:
   a pin member having an external thread formed thereon with a sealing element located on one side of the external thread and a contact surface located on the other side of the external thread; and
   a box member having an internal thread formed thereon with a first contact surface located on one side of the internal thread and a second contact surface located on the other side of the internal thread;
   wherein the external thread of the pin member and the internal thread of the box member correspond with and are configured to engage with each other, the sealing element of the pin member and the second contact surface of the box member correspond with and are configured to engage with each other, and the first contact surface of the box member and the contact surface of the pin member correspond with and are configured to engage with each other,
   wherein the external thread of the pin member comprises a pin load flank and the internal thread of the box member comprises a box load flank, each with a negative flank angle,
   wherein the pin member comprises a load redirection groove formed thereon between the external thread and the sealing element of the pin member, and
   wherein the box member comprises a load redirection groove formed thereon between the internal thread and the first contact surface of the box member.

2. The threaded connector of claim 1, wherein the sealing element of the pin member and the second contact surface of the box member are configured to form a seal therebetween, and wherein the first contact surface of the box member and the contact surface of the pin member are configured to form a metal-to-metal seal therebetween.

3. The threaded connector of claim 1, wherein the pin member comprises a load shoulder formed thereon configured to engage a nose of the box member.

4. The threaded connector of claim 1, wherein at least a portion of the contact surface of the pin member and the second contact surface of the box member extends in a direction substantially similar to that as the first contact surface of the box member.

5. The threaded connector of claim 4, wherein the at least portion of the contact surface of the pin member and the second contact surface of the box member is disposed within about ten degrees of the first contact surface of the box member.

6. The threaded connector of claim 1, wherein the sealing element of the pin member is located near a proximal end of the pin member and the contact surface of the pin member is located near a distal end of the pin member, and wherein the first contact surface of the box member is located near a proximal end of the box member and the second contact surface of the box member is located near a distal end of the box member.

7. The threaded connector of claim 1, wherein the external thread of the pin member and the internal thread of the box member are formed on a substantially single taper.

8. The threaded connector of claim 7, wherein at least one of the contact surface of the pin member and the first contact surface of the box member protrudes above a plane extending across the substantially single taper.

9. The threaded connector of claim 1, wherein at least one of the pin member and the box member comprises an alignment surface formed thereon.

10. The threaded connector of claim 1, wherein the box member comprises an external elevator shoulder formed thereon, and wherein the external elevator shoulder comprises an elliptical groove formed upon the box member.

11. The threaded connector of claim 1, wherein the large diameter tubular member comprises an outer diameter of at least 20 in (50.8 cm).

12. The threaded connector of claim 1, wherein the sealing element comprises an o-ring disposed within a groove formed on the pin member.

13. A method of manufacturing a threaded connector for a large diameter tubular member, the method comprising:
    forming an external thread on a pin member, the pin member having a contact surface located on one side of the external thread and a sealing element located on the other side of the external thread;
    forming an internal thread on a box member, the box member having a first contact surface located on one side of the internal thread and a second contact surface located on the other side of the internal thread;
    wherein the external thread of the pin member and the internal thread of the box member correspond with and are configured to engage with each other, the sealing element of the pin member and the second contact surface of the box member correspond with and are configured to engage with each other, and the first contact surface of the box member and the contact surface of the pin member correspond with and are configured to engage with each other;
    forming a pin load flank having a negative flank angle on the external thread of the pin member;
    forming a box load flank having a negative flank angle on the internal thread of the box member;
    forming a load redirection groove on the pin member between the external thread and the sealing element of the pin member; and
    forming a load redirection groove on the box member between the internal thread and the first contact surface of the box member.

14. The method of claim 13, wherein the sealing element of the pin member and the second contact surface of the box member are configured to form a seal therebetween, and wherein the first contact surface of the box member and the contact surface of the pin member are configured to form a metal-to-metal seal therebetween.

15. The method of claim 13, further comprising:
    forming a load shoulder on the pin member that is configured to engage a nose of the box member;
    forming a load shoulder on the box member that is configured to engage a nose of the pin member,
    the load shoulder of the pin member and the nose of the box member tapered with respect to an axis of the threaded connector, and
    the load shoulder of the box member and the nose of the pin member tapered with respect to the axis of the threaded connector.

16. The method of claim 13, wherein the sealing element comprises an o-ring disposed within a groove formed on the pin member.

17. The method of claim 13, wherein the sealing element of the pin member is located near a proximal end of the pin member and the contact surface of the pin member is located near a distal end of the pin member, and wherein the first contact surface of the box member is located near a proximal end of the box member and the second contact surface of the box member is located near a distal end of the box member.

18. A threaded connector for connecting large diameter tubular members together, the threaded connector comprising:
    a first tubular member including a pin member having a nose, a load shoulder, and an external thread formed thereon with a contact surface located on one side of the external thread and a sealing element located on the other side of the external thread; and
    a second tubular member including a box member having a nose, a load shoulder, and an internal thread formed thereon with a first contact surface located on one side of the internal thread and a second contact surface located on the other side of the internal thread;
    the first tubular member and second tubular member having an outer diameter of at least 20 in (50.8 cm);
    wherein, upon make-up of the pin member with the box member,
        the load shoulder of the pin member and the nose of the box member are configured to engage with each other,
        the load shoulder of the box member and the nose of the pin member are configured to engage with each other,
        the external thread of the pin member and the internal thread of the box member are configured to engage with each other,
        the sealing element of the pin member and the second contact surface of the box member are configured to engage with each other, thereby forming a seal therebetween, and
        the first contact surface of the box member and the contact surface of the pin member are configured to engage with each other, thereby forming a metal-to-metal seal therebetween,
    wherein the external thread of the pin member comprises a pin load flank and the internal thread of the box member comprises a box load flank, each with a negative flank angle,
    wherein the pin member comprises a load redirection groove formed thereon between the external thread and the sealing element of the pin member, and
    wherein the box member comprises a load redirection groove formed thereon between the internal thread and the first contact surface of the box member.

19. The threaded connector of claim 18, wherein the sealing element comprises an o-ring disposed within a groove formed on the pin member.

20. The threaded connector of claim 18, wherein at least a portion of the contact surface of the pin member and the second contact surface of the box member extends in a direction substantially similar to that as the first contact surface of the box member.

21. The threaded connector of claim 20, wherein the at least portion of the contact surface of the pin member and the second contact surface of the box member is disposed within about ten degrees of the first contact surface of the box member.

22. The threaded connector of claim 18, wherein the sealing element of the pin member is located near a proximal end of the pin member and the contact surface of the pin member is located near a distal end of the pin member, and wherein the first contact surface of the box member is located near a proximal end of the box member and the second contact surface of the box member is located near a distal end of the box member.

23. The threaded connector of claim 18, wherein the external thread of the pin member and the internal thread of the box member are formed on a substantially single taper, and wherein at least one of the contact surface of the pin member and the first contact surface of the box member protrudes above a plane extending across the substantially single taper.

24. The threaded connector of claim 18, wherein the load shoulder of the box member and the nose of the pin member are tapered with respect to the axis of the threaded connector.

* * * * *